US012717829B2

(12) United States Patent
Chen et al.

(10) Patent No.: US 12,717,829 B2
(45) Date of Patent: Aug. 25, 2026

(54) INFORMATION RETRIEVAL SYSTEM USING A HIERARCHICAL CORPUS ENCODER

(71) Applicant: Microsoft Technology Licensing, LLC, Redmond, WA (US)

(72) Inventors: Tongfei Chen, Seattle, WA (US); Adam David Pauls, San Francisco, CA (US); Ankita Sharma, Sunnyvale, CA (US); Benjamin David Van Durme, Baltimore, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/897,188

(22) Filed: Sep. 26, 2024

(65) Prior Publication Data

US 2026/0087051 A1 Mar. 26, 2026

(51) Int. Cl.
*G06F 16/334* (2025.01)
*G06F 16/31* (2019.01)
*G06N 3/0455* (2023.01)

(52) U.S. Cl.
CPC ........ *G06F 16/3347* (2019.01); *G06F 16/322* (2019.01); *G06F 16/3344* (2019.01); *G06N 3/0455* (2023.01)

(58) Field of Classification Search
CPC . G06F 16/3347; G06F 16/322; G06F 16/3344
USPC .......................................................... 707/728
See application file for complete search history.

(56) References Cited

U.S. PATENT DOCUMENTS 11,003,865 B1 * 5/2021 Lee ......................... G06F 40/56
11,409,752 B1 * 8/2022 Qadrud-Din ........... G06N 20/00
2014/0236578 A1 * 8/2014 Malon ..................... G06F 40/40 704/9
2020/0193323 A1 * 6/2020 Alesiani ................ B25J 9/1661
(Continued)

FOREIGN PATENT DOCUMENTS

CN 116932763 A 10/2023

OTHER PUBLICATIONS

Wang et al. "Incorporating Hierarchy into Text Encoder: a Contrastive Learning Approach for Hierarchical Text Classification." Mar. 23, 2022. https://arxiv.org/pdf/2203.03825 (Year: 2022).*
(Continued)

*Primary Examiner* — Kimberly L Wilson
(74) *Attorney, Agent, or Firm* — Michael T. Abramson; Jordan IP Law, LLC

(57) ABSTRACT

A dense encoder is adapted as a hierarchical corpus encoder in an information retrieval system to use negative samples from sibling nodes in a hierarchical tree of vector embeddings for documents in a corpus. Both the encoder and hierarchical tree are co-trained using a loss function that takes the document hierarchy into account. The hierarchical corpus encoder may be used in both supervised training cases where query-document relevance judgments are present and in zero-shot cases where a query dataset is absent. The hierarchical corpus encoder demonstrates significant performance improvements over a variety of dense encoder and generative retrieval baselines, under both supervised and unsupervised scenarios, thereby establishing the effectiveness of jointly learning a document hierarchy.

20 Claims, 12 Drawing Sheets

(56) References Cited

U.S. PATENT DOCUMENTS

2022/0374459 A1* 11/2022 Liu ........................ G06F 16/337
2023/0229906 A1* 7/2023 Zhang .................... G06N 3/045
706/21

OTHER PUBLICATIONS

Bevilacqua, et al., "Autoregressive Search Engines: Generating Substrings as Document Identifiers", In 36th Conference on Neural Information Processing Systems, Dec. 2022, 16 Pages.
Cao, et al, "Autoregressive Entity Retrieval," arXiv:2010.00904v3, Mar. 24, 2021, 20 pages.
Chen, et al., "A simple framework for contrastive learning of visual representations", In Proceedings of the 37th International Conference on Machine Learning, 2020, 11 pages.
Chen, et al., "Hierarchical Corpus Encoder: Fusing Generative Retrieval and Dense Indices", In repository of arXiv:2502.18877v1, Feb. 26, 2025, 16 Pages.
Chen, et al., "Hierarchical Entity Typing via Multi-level Learning to Rank", In Proceedings of the 58th Annual Meeting of the Association for Computational Linguistics, Jul. 5-10, 2020, pp. 8465-8475.
Dhillon, et al., "Concept Decompositions for Large Sparse Text Data Using Clustering", Machine learning, vol. 42, Issue No. 1, 2001, pp. 143-175.
Douze, et al., "The Faiss Library", arXiv:2401.08281v1, Jan. 16, 2024, 21 pages.
Gao, et al., "SimCSE: Simple contrastive learning of sentence embeddings", In Proceedings of the 2021 Conference on Empirical Methods in Natural Language Processing, 2021, pp. 6894-6910.
Henderson, et al., "Efficient Natural Language Response Suggestion for Smart Reply", In Repository of arXiv:1705.00652v1, May 1, 2017, 15 Pages.
Hofstätter, et al., "Efficiently Teaching an Effective Dense Retriever with Balanced Topic Aware Sampling", In Repository of arXiv:2104.06967v2, May 26, 2021, 10 Pages.
International Search Report and Written Opinion received for PCT Application No. PCT/US2025/036372, mailed on Oct. 10, 2025, 16 pages.
Izacard, et al., "Unsupervised Dense Information Retrieval with Contrastive Learning", Published in Transactions on Machine Learning Research, Aug. 29, 2022, 21 pages.
Joshi, et al., "TriviaQA: A Large Scale Distantly Supervised Challenge Dataset for Reading Comprehension", In Proceedings of the 55th Annual Meeting of the Association for Computational Linguistics, vol. 1: Long Papers, Jul. 30, 2017, pp. 1601-1611.
Karpukhin, et al., "Dense Passage Retrieval for Open-Domain Question Answering", In Proceedings of the Conference on Empirical Methods in Natural Language Processing, Nov. 16, 2020, pp. 6769-6781.
Kishore, et al., "IncDSI: Incrementally Updatable Document Retrieval", In Proceedings of the 40th International Conference on Machine Learning, Jul. 2023, 13 Pages.
Kwiatkowski, et al., "Natural Questions: A Benchmark for Question Answering Research," in Transactions of the Association for Computational Linguistics, vol. 7, 2019, pp. 453-466.
Lee, et al., "Latent retrieval for weakly supervised open domain question answering", In Proceedings of the 57th Annual Meeting of the Association for Computational Linguistics, 2019, pp. 6086-6096.
Mehta, et al., "DSI++: Updating Transformer Memory with New Documents,", Proceedings of the 2023 Conference on Empirical Methods in Natural Language Processing, Dec. 6, 2023, pp. 8198-8213.
Mikolov, et al., "Distributed Representations of Words and Phrases and their Compositionality", Advances in Neural Information Processing Systems 26, 2013, 9 pages.
Morin, et al., "Hierarchical Probabilistic Neural Network Language Model", In International Workshop on Artificial Intelligence and Statistics, Jan. 6, 2005, 13 Pages.
Muja, et al., "Fast Approximate Nearest Neighbors with Automatic Algorithm Configuration", In Proceedings of the Fourth International Conference on Computer Vision Theory and Applications, Lisboa, Portugal, vol. 1, Feb. 5, 2009, pp. 331-340.
Nguyen, et al., "MS MARCO: A Human Generated MAchine Reading Comprehension Dataset", In International Conference on Learning Representations, 2016, 10 Pages.
Ni, et al., "Large Dual Encoders Are Generalizable Retrievers", In Proceedings of the Conference on Empirical Methods in Natural Language Processing, 2022, pp. 9844-9855.
Nister, et al., "Scalable Recognition with a Vocabulary Tree", In Proceedings of the IEEE Computer Society Conference on Computer Vision and Pattern Recognition, Jun. 17, 2006, 8 Pages.
Nogueira, et al., "From Doc2query to DocTTTTTquery", MS MARCO passage retrieval task, 2019, 03 Pages.
Robertson, et al., "Okapi at Trec-3", In Proceedings of The Third Text Retrieval Conference (TREC-3), 1994, pp. 109-126.
Shazeer, et al., "Adafactor: Adaptive Learning Rates with Sublinear Memory Cost", In Proceedings of International Conference on Machine Learning—PMLR, vol. 80, 2018, 09 Pages.
Shrivastava, et al., "Asymmetric LSH (ALSH) for Sublinear Time Maximum Inner Product Search (MIPS)", In Advances in neural information processing systems, vol. 27, 2014, 09 Pages.
Sohn, Kihyuk, "Improved Deep Metric Learning with Multi-class N-pair Loss Objective," in Proceedings of the 30th Conference on Neural Information Processing Systems, NIPS, Dec. 5, 2016, 9 pages.
Sun, et al., "Learning to Tokenize for Generative Retrieval", In 37th Conference on Neural Information Processing Systems, 2023, 17 Pages.
Tay, et al., "Transformer Memory as a Differentiable Search Index. ", In 36th Conference on Neural Information Processing Systems, 2022, 13 pages.
Thakur, et al., "BEIR: A Heterogeneous Benchmark for Zero-Shot Evaluation of Information Retrieval Models", In Proceedings of 35th Conference on Neural Information Processing Systems Datasets and Benchmarks Track, 2021, 16 pages.
Wang, et al., "Understanding Contrastive Representation Learning through Alignment and Uniformity on the Hypersphere", Proceedings of the 37th International Conference on Machine Learning, vol. 119, Jul. 13, 2020, 11 Pages.
Wang, et al., "A Neural Corpus Indexer for Document Retrieval," In 36th Conference on Neural Information Processing Systems, Nov. 28, 2022, 15 Pages.
Xiong, et al., "Approximate nearest neighbor negative contrastive learning for dense text retrieval", In Proceedings of International Conference on Learning Representations, 2021, 16 Pages.
Zhang, et al., "Adversarial Retriever-ranker For Dense Text Retrieval", In the Tenth International Conference on Learning Representations, 2022, 16 Pages.

* cited by examiner

100
Information retrieval application
130-1
120-1
115-1
Information retrieval application
130-1
120-2
115-2
Network
125
135-1
Document corpus
135-N
Document corpus
110
Hierarchical corpus encoder
105
Information retrieval system 105
Hierarchical tree
440
210
MIPS index
Dense vector embeddings for documents
110
410
Hierarchical corpus encoder
425
Encoder
415
135
215
Ranked document list
Matching
435
405
Shared parameters (430)
420
Encoder
Query
205
Dense vector embeddings for query

500

600
Root node
605
$N^{(0)} = \lceil N^{(1)} / b \rceil = 1$
$N^{(1)} = \lceil N^{(2)} / b \rceil$
$N^{(2)} = \lceil N^{(3)} / b \rceil$
$N^{(3)} = |\mathcal{D}|$
Leaf node
610
Agglomerative clustering

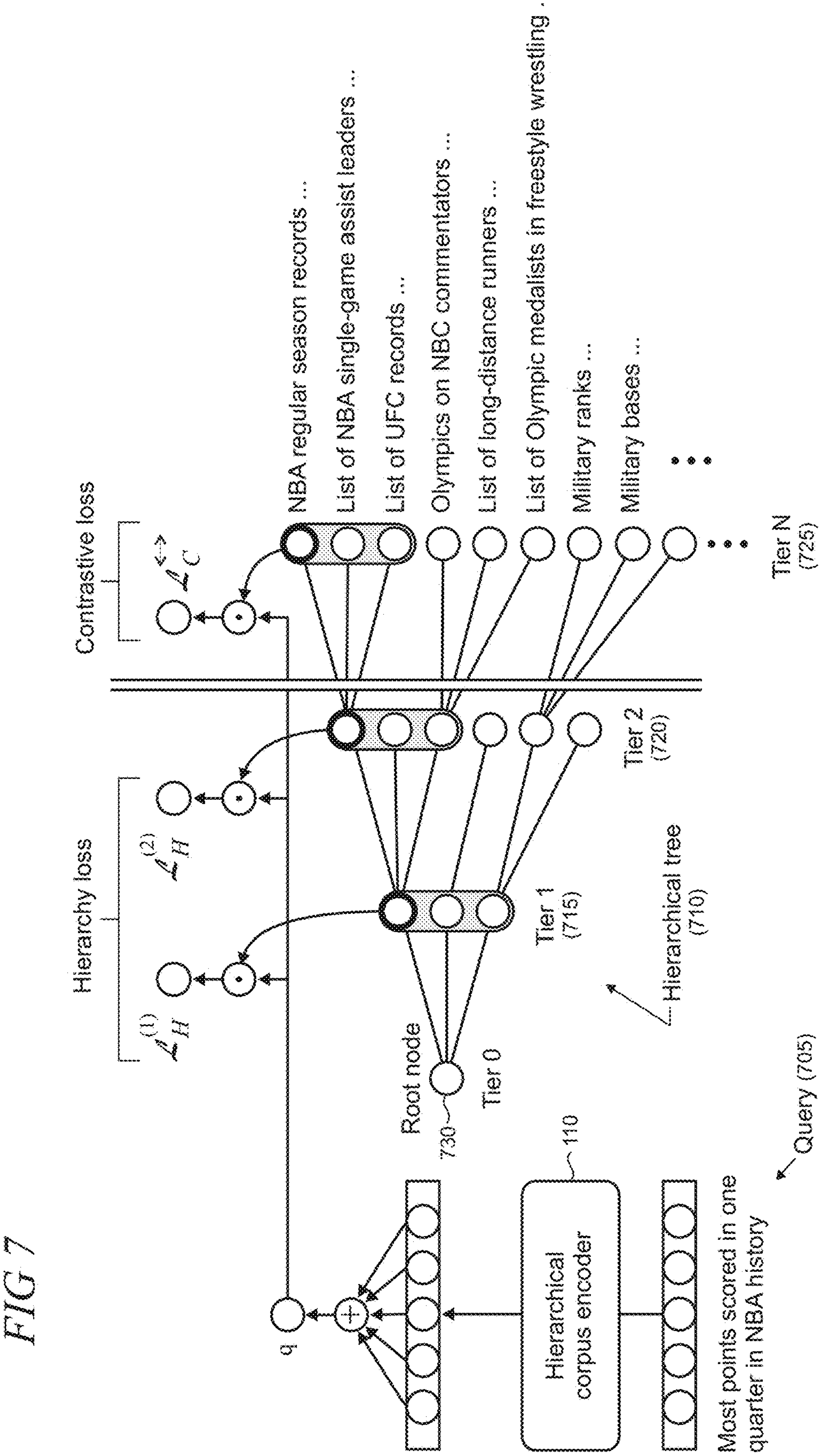
FIG 7
Hierarchy loss
Contrastive loss
$\mathcal{L}_H^{(1)}$
$\mathcal{L}_H^{(2)}$
$\mathcal{L}_C^{\leftrightarrow}$
q
Hierarchical corpus encoder
110
Most points scored in one quarter in NBA history
Query (705)
Root node
730
Tier 0
Tier 1 (715)
Tier 2 (720)
Tier N (725)
Hierarchical tree (710)
NBA regular season records ...
List of NBA single-game assist leaders ...
List of UFC records ...
Olympics on NBC commentators ...
List of long-distance runners ...
List of Olympic medalists in freestyle wrestling ...
Military ranks ...
Military bases ...

NDCG@10 -- Average across BEIR-14 datasets under non-supervised training

| | BM25 | DPR | ANCE | TAS-B | T5-base | | T5-large | |
|---|---|---|---|---|---|---|---|---|
| | | | | | GTR | **HCE** | GTR | **HCE** |
| Average | 0.430 | 0.255 | 0.405 | 0.432 | 0.433 | **0.461** | 0.462 | **0.485** |

BM25 = Best Match 25
DPR = Dense Passage Retrieval
ANCE = Approximate Nearest Neighbor Negative Contrastive Estimation
TAS-B = Topic-aware Sampling - Balanced
T5-base = Text-to-Text Transfer Transformer-base
T5-large = Text-to-Text Transfer Transformer-large
GTR = Generalizable T5 Retrieval
HCE = Hierarchical Corpus Encoder

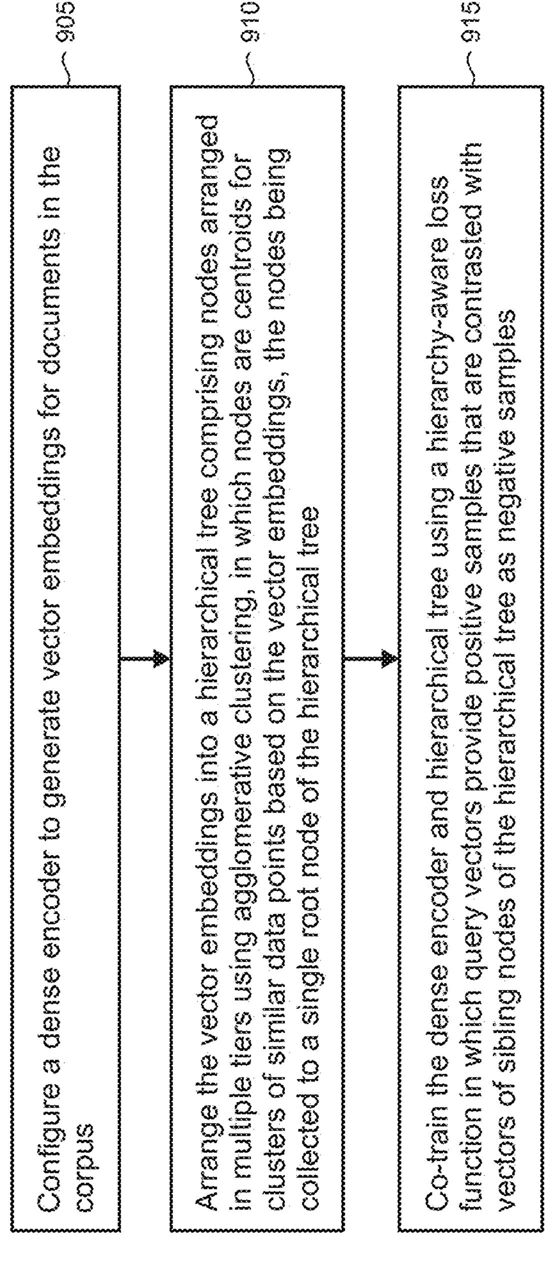
FIG 9
900
Configure a dense encoder to generate vector embeddings for documents in the corpus
905
Arrange the vector embeddings into a hierarchical tree comprising nodes arranged in multiple tiers using agglomerative clustering, in which nodes are centroids for clusters of similar data points based on the vector embeddings, the nodes being collected to a single root node of the hierarchical tree
910
Co-train the dense encoder and hierarchical tree using a hierarchy-aware loss function in which query vectors provide positive samples that are contrasted with vectors of sibling nodes of the hierarchical tree as negative samples
915

1000

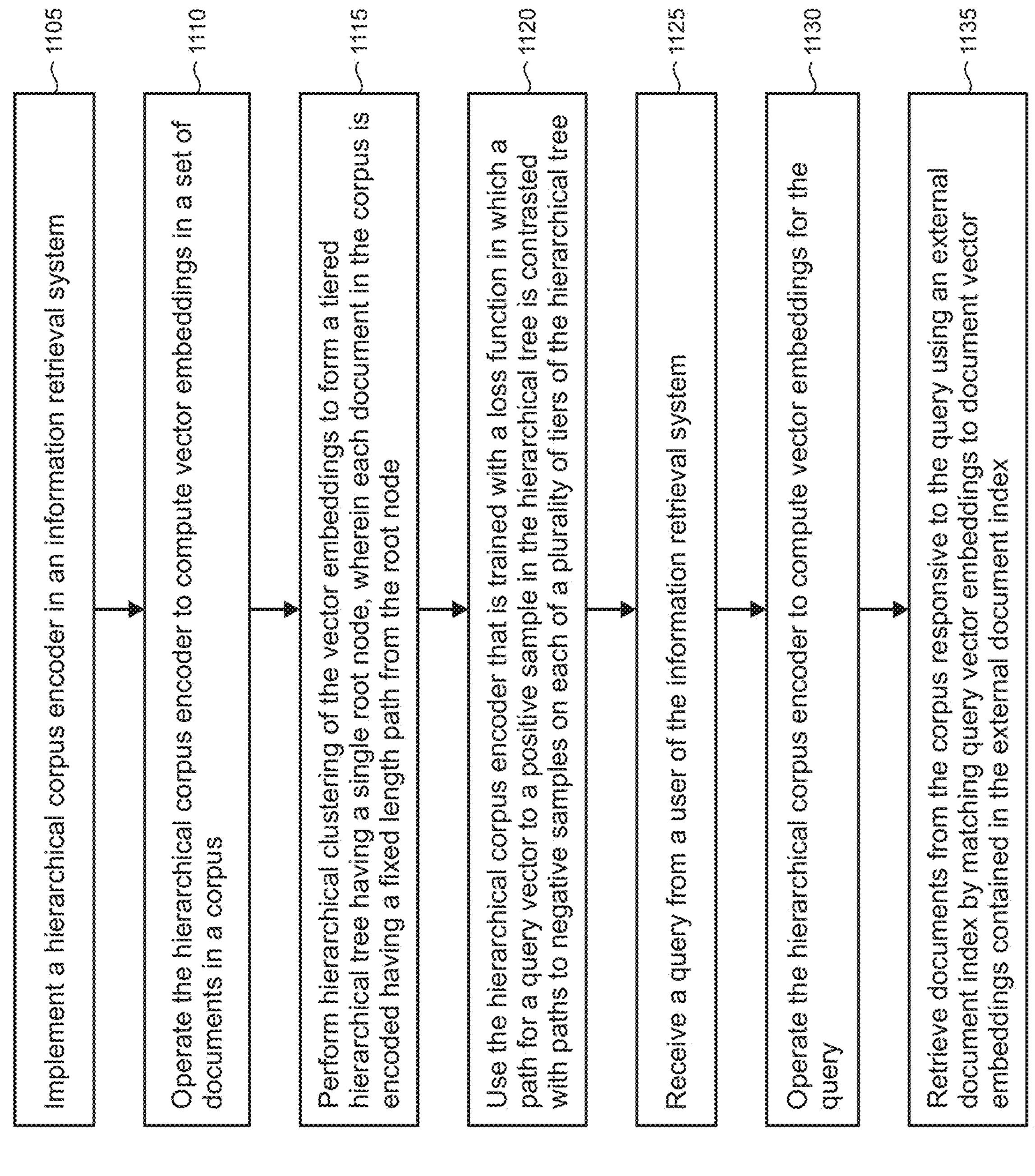
FIG 11
1100
Implement a hierarchical corpus encoder in an information retrieval system
1105
Operate the hierarchical corpus encoder to compute vector embeddings in a set of documents in a corpus
1110
Perform hierarchical clustering of the vector embeddings to form a tiered hierarchical tree having a single root node, wherein each document in the corpus is encoded having a fixed length path from the root node
1115
Use the hierarchical corpus encoder that is trained with a loss function in which a path for a query vector to a positive sample in the hierarchical tree is contrasted with paths to negative samples on each of a plurality of tiers of the hierarchical tree
1120
Receive a query from a user of the information retrieval system
1125
Operate the hierarchical corpus encoder to compute vector embeddings for the query
1130
Retrieve documents from the corpus responsive to the query using an external document index by matching query vector embeddings to document vector embeddings contained in the external document index
1135

1200
CPU
1202
Network
I/F
1216
I/O
controller
1218
1210
Memory
1204
RAM
1206
ROM
1208
Mass storage
device
1212

INFORMATION RETRIEVAL SYSTEM USING A HIERARCHICAL CORPUS ENCODER

BACKGROUND

Information retrieval (IR) systems are designed to help users find relevant information from large collections of data or documents. These systems typically work by indexing a corpus of documents, processing user queries, and returning ranked results that best match the query.

SUMMARY

An information retrieval system includes a hierarchical corpus encoder for indexing a corpus document set with or without supervision. Co-training is provided to the hierarchical corpus encoder which operates under dense encoder principles and is also provided to a tiered hierarchical model of the document set to thereby jointly optimize the encoder and the hierarchy. The hierarchical corpus encoder computes vector embeddings for the document set which are grouped using agglomerative clustering to create the tree-based model of the corpus. During training, a hierarchy-aware loss function is utilized by which positive samples (i.e., documents having relevance to a given training query to the system) are contrasted against sibling nodes on tiers of the hierarchy tree as negative samples (i.e., irrelevant documents). Re-clustering of the hierarchical tree can be triggered if training indicates that another representation of the corpus would be more optimal for information retrieval.

The vector embeddings produced by the hierarchical corpus encoder to generate the hierarchical tree for the documents are also fed into an external document index. During runtime of the information retrieval system, when receiving user queries, the system employs the external document index using, for example, MIPS (maximum inner-product search), to identify and retrieve relevant documents that are responsive to the queries.

Use of tiered hierarchical negative samples mimics the sequence model-based training dynamics used in hierarchical generative retrieval systems while being implemented in the dense retrieval-based hierarchical corpus encoder. This approach advantageously provides the benefits of both generative and dense retrieval machine learning models. Performance is improved compared to conventional dense encoders that use contrastive learning. In addition, improvements in both zero-shot adaptation to new corpora and domains and supervised learning scenarios are realized compared to conventional generative retrieval because new documents can be encoded and added to the MIPS index without the need for additional training. The hierarchical corpus encoder is also readily scalable to large corpora while maintaining efficiency for optimized information retrieval.

The information retrieval system with hierarchical corpus encoder provides performance improvements over a variety of traditional dense encoder and generative retrieval systems on the BEIR (Benchmarking IR) benchmark for the evaluation of information retrieval models. For both supervised and unsupervised training scenarios, the joint learning of encoder and document hierarchy is demonstrated to consistently provide significant measurable improvements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 7 shows illustrative training of a dense encoder in which a query is contrasted with tiered negative samples;

FIG. 8 shows a chart comparing the performance of the present hierarchical corpus encoder with various other conventional information retrieval models;

FIGS. 9, 10, and 11 show illustrative methods that may be performed when implementing the present information retrieval system using a hierarchical corpus encoder.

Like reference numerals indicate like elements in the drawings. Elements are not drawn to scale unless otherwise indicated.

DETAILED DESCRIPTION

Disclosed herein is a dense encoder, operable on a computing device such as a server, that is adapted as a hierarchical corpus encoder in an information retrieval system to use negative samples from sibling nodes in a hierarchical tree of vector embeddings for documents in a corpus. Both the encoder and hierarchical tree are co-trained using a loss function that takes the document hierarchy into account. The hierarchical corpus encoder is usable in both supervised training cases where query-document relevance judgments are present and in zero-shot cases where a query dataset is absent. The hierarchical corpus encoder demonstrates significant performance improvements over a variety of dense encoder and generative retrieval baselines, under both supervised and unsupervised scenarios, thereby establishing the effectiveness of jointly learning a document hierarchy. In addition, improved performance of the computing device on which the hierarchical corpus encoder operates is realized by being more scalable and computationally efficient compared with conventional generative retrieval systems.

Figure 1:
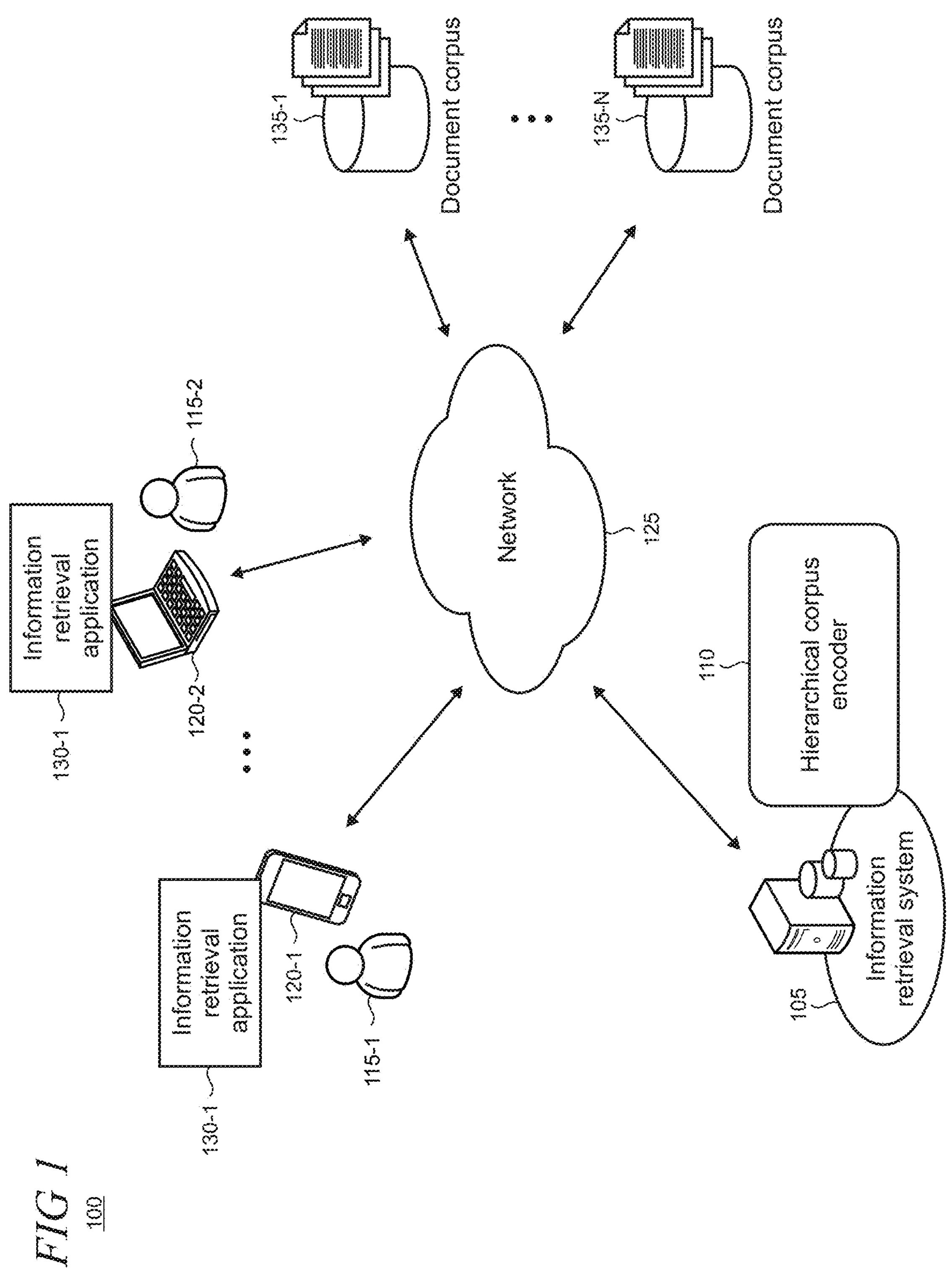
FIG. 1 shows an illustrative use environment for the present information retrieval system using a hierarchical corpus encoder.

Turning now to the drawings, FIG. 1 shows an illustrative use environment 100 for an information retrieval system 105 using a hierarchical corpus encoder 110. Users 115 of computing devices 120 such as smartphones, laptops, tablets, personal computers, game systems, wearable devices, etc., communicate with the information retrieval system over a communications network 125. The network typically comprises one or more of mobile networks, local- and wide-area networks, enterprise and private networks, and publicly-accessible networks such as the Internet. The computing devices support an information retrieval application 130 that can be implemented, for example, as a standalone application or be a browser-based application.

The use environment 100 supports document corpora 135 which are structured collections of texts that serve as datasets from which information is retrieved. A typical use case includes a data storage facility holding a corpus of documents that are accessible to users 115, for example, using an enterprise network supported by an organization such as a school or business. The users seek to retrieve documents of interest and other information in response to their queries. The information retrieval system 105 may be hosted by the organization or otherwise be accessed, for example, as a cloud-based service supported by an information retrieval service provider. The use environment 100 depicted in FIG. 1 and described herein for the present information retrieval system using a hierarchical corpus encoder is intended to be illustrative only and should not be construed as limiting the scope of the invention. While specific examples of potential applications and settings are provided, it is understood that the invention may be utilized in various other environments, contexts, and applications not explicitly shown or described, as would be apparent to one skilled in the art upon review of this disclosure.

Figure 2:
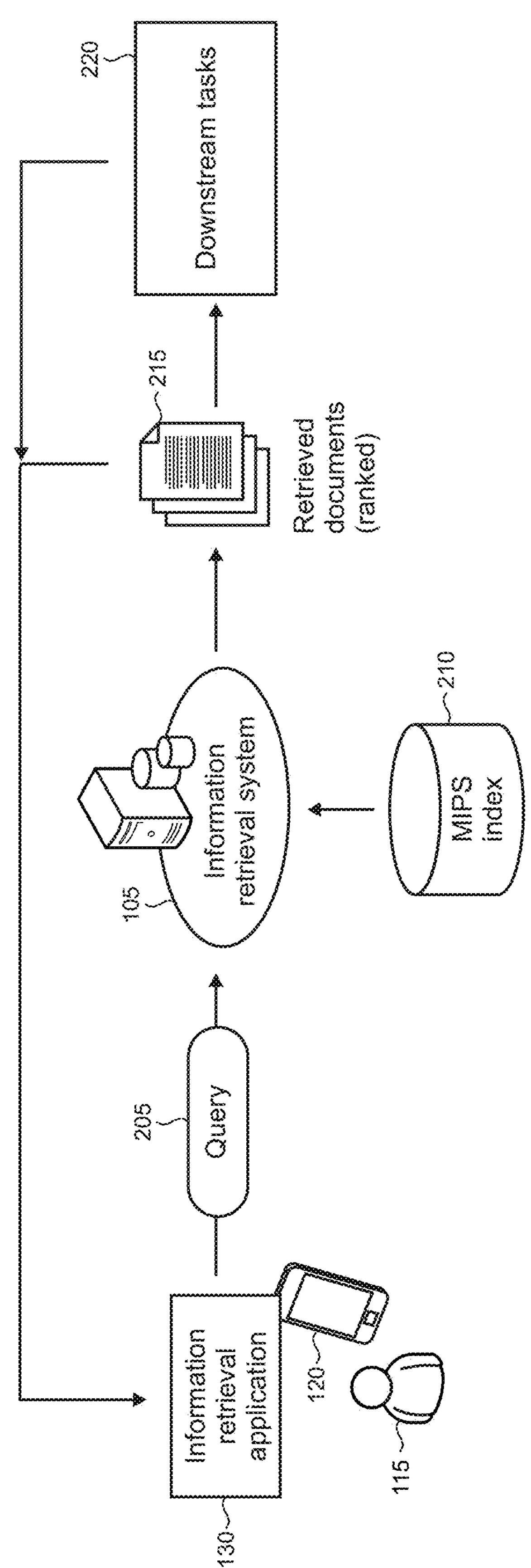
FIG. 2 shows an illustrative overview of user interactions with an exemplary information retrieval system.

FIG. 2 shows an illustrative overview of user interactions with the information retrieval system 105. Using the information retrieval application 130, the user submits a query 205 to the system which processes the query and matches parameters from the query to data in an external document index. In this illustrative example, a MIPS index 210 is utilized, although other types of indices using other algorithms may also be used in alternative embodiments, for example, a nearest neighbor search (NNS). Suitable product quantization (PQ) methods (e.g., using K-means clustering) are employable to reduce the memory of the document index in some embodiments.

The information retrieval system 105 retrieves documents 215 from the corpus, in response to the query 205, which are sent to the information retrieval application 130, typically in ranked order by relevance. In some cases, downstream tasks 220 are performed by the information retrieval system.

Figure 3:
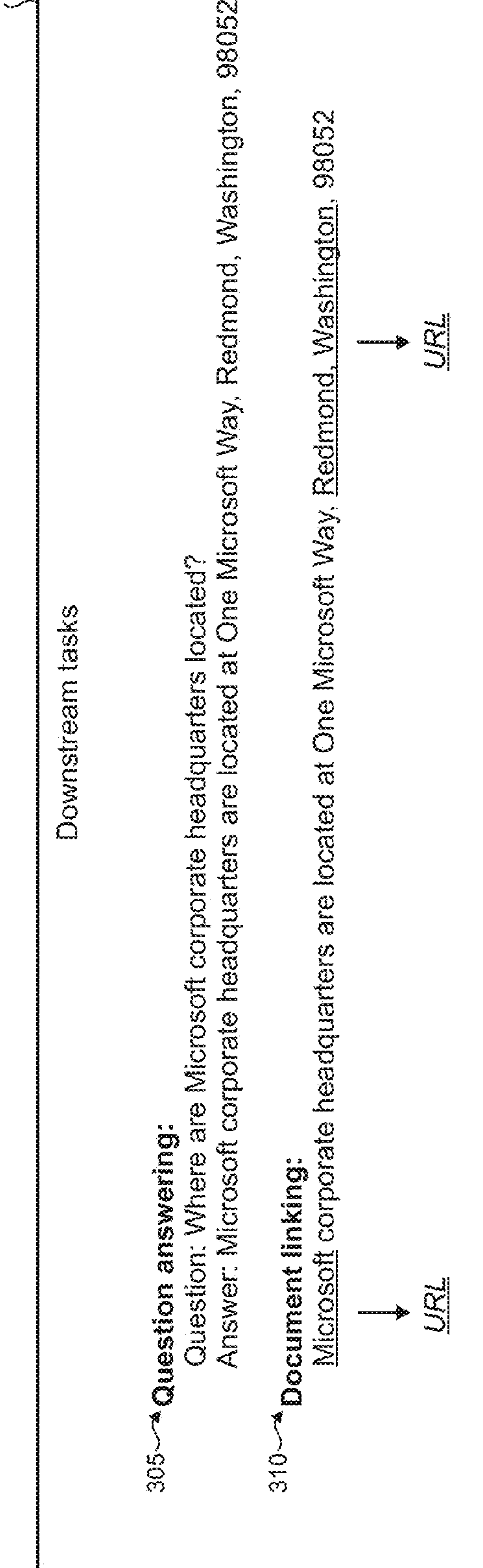
FIG. 3 shows illustrative downstream tasks.

FIG. 3 shows illustrative downstream tasks 220 which include question answering (indicated by reference numeral 305) and document linking 310 in which URLs (uniform resource locators) to sources of additional information are provided. It is emphasized that these downstream tasks are illustrative and not exhaustive and that other tasks may be supported by the information retrieval system 105 to meet specific requirements of a particular implementation.

The MIPS index 210 is typically generated using offline processes to facilitate scalability and efficiency. In an illustrative example, the hierarchical corpus encoder generates the MIPS index, however, a separate encoder may be alternatively utilized in some use cases.

Figure 4:
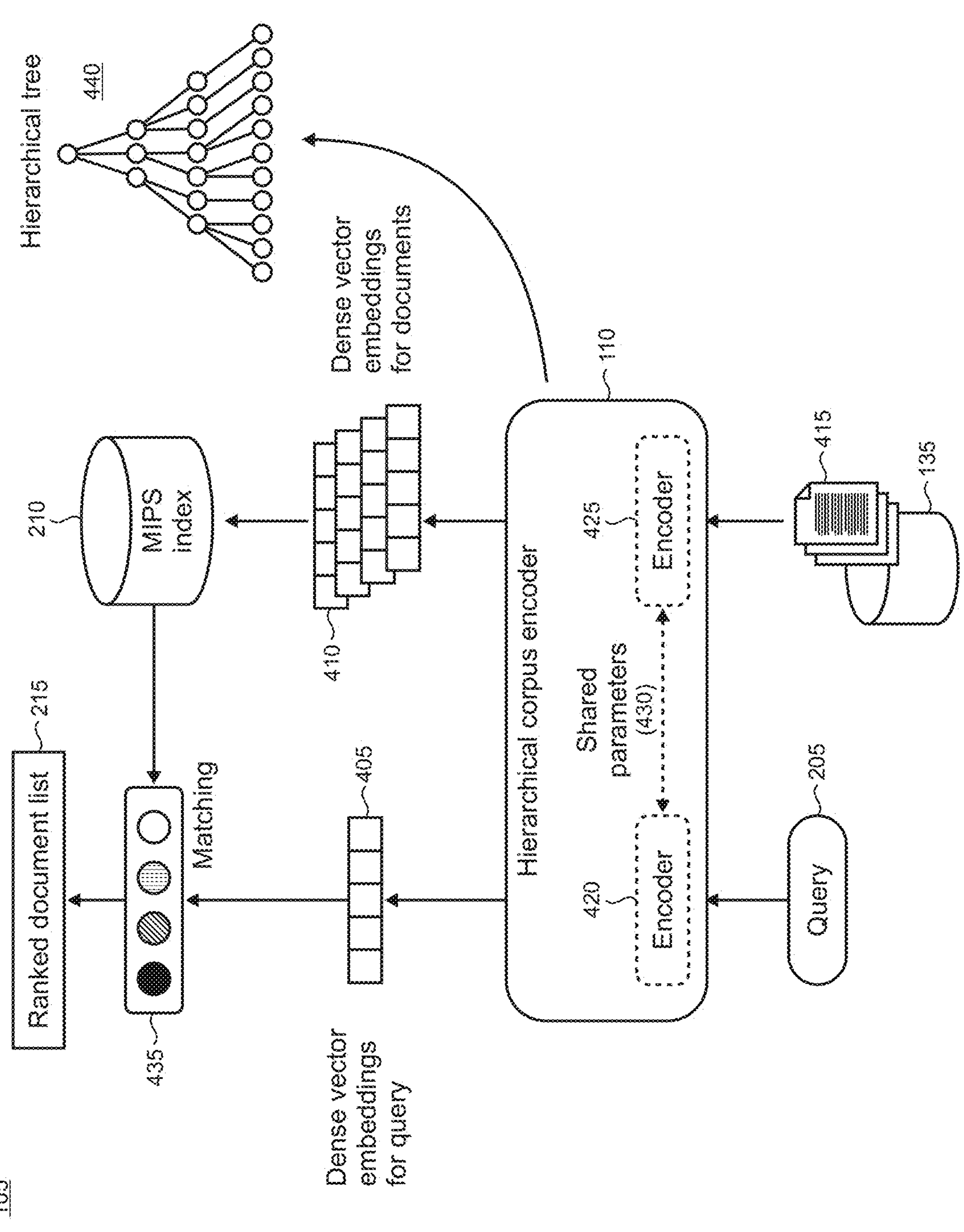
FIG. 4 shows an illustrative hierarchical corpus encoder arranged in accordance with the present principles.

FIG. 4 shows components of the information retrieval system 105 which include the hierarchical corpus encoder 110 configured as a dense encoder that generates dense vector embeddings 405 and 410, respectively for the query 205 and documents 415 from a corpus 135. The vector embeddings can include encodings of tokens for suitable prefixes. By encoding the text sequence as a dense vector embedding, information retrieval models can effectively match queries to relevant documents even when they do not share exact keywords, thereby leveraging the semantic understanding captured in the embedding space.

The hierarchical corpus encoder 110 in this illustrative example is based upon a T5 (text-to-text transfer transformer) dense retrieval encoder that leverages the Generalizable T5 Retriever (GTR) architecture for encoding queries and documents into the dense vector representations. T5-based dense retrieval encoders are generally recognized as being particularly useful in natural language understanding tasks, search applications, and other scenarios and use cases where semantic matching of text in large datasets is important.

GTR implementations typically employ a bi-encoder architecture in which separate encoders 420 and 425 separately handle respective vector encoding for the query and documents. The encoders 420 and 425 typically share parameters (as indicated by reference numeral 430) to enable unified and coordinated operation and thus effectively function as a single text encoder. The MIPS index 210 is utilized with a matching component 435 that matches documents with the query to provide the ranked document list 215 as an output of the information retrieval system 105.

Figure 5:
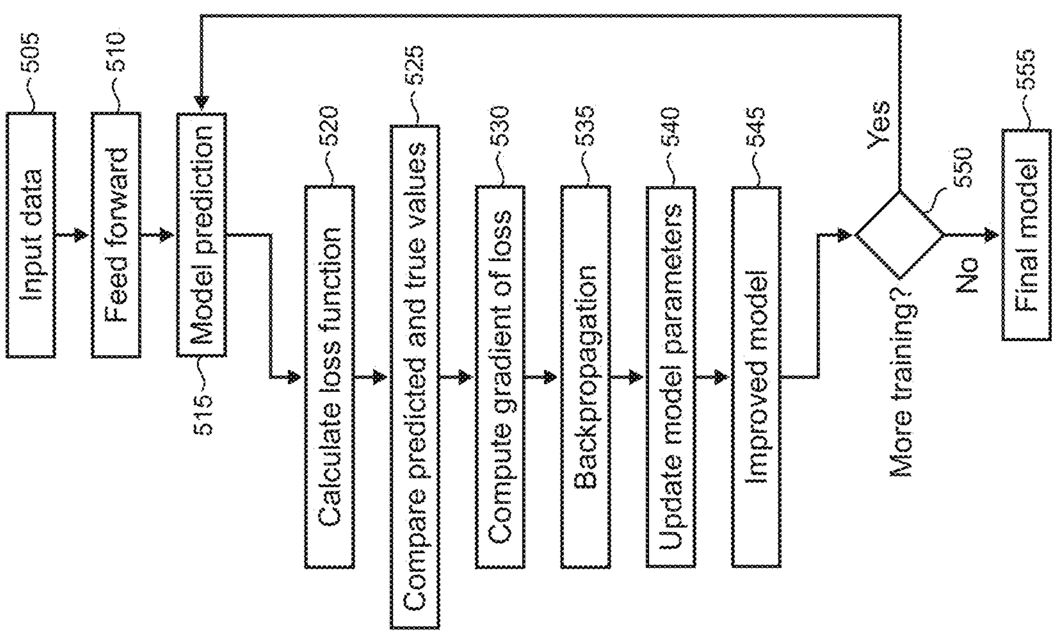
FIG. 5 illustratively shows how a machine learning model is trained using a loss function.

As discussed in more detail in the text accompanying FIG. 5 below, the hierarchical corpus encoder 110 learns a hierarchical tree 440. In typical embodiments of the present principles, the hierarchical tree is discarded after co-training and the vector embeddings 410 are fed into the MIPS index 210. The tree may be safely discarded because only the encoder is needed for downstream (i.e., runtime) document indexing and retrieval.

As previously noted, the hierarchical corpus encoder 110 is trained using tiered hierarchical negative samples as a loss function. FIG. 5 provides an illustrative overview of a process flow 500 for training of a machine learning model (e.g., utilizing a neural network) using a loss function. Input data 505 undergoes feed forward processing 510 to generate a model prediction 515. A loss function 520 is calculated and a comparison 525 is made between predicted and true values. A loss gradient 530 is computed which is backpropagated 535 through the network layers. At each layer of the model, the gradient with respect to that layer's weights and biases is computed to provide an update of model parameters 540. The updates thus provide an improved model 545 via training. If more training is not deemed necessary at decision block 550, then a final model 555 is created. Otherwise, the training is repeated.

The tiered hierarchical negative samples are obtained from a hierarchical tree 600 (shown in FIG. 6) providing a representation of a document corpus that is generated, for example, using agglomerative clustering. Here, given an initial encoder, $F_0$, all the vectors in the document corpus may be computed $\mathcal{D}: \{F_0(d)\}_{d \in D}$. An agglomerative version of hierarchical clustering is performed to form the hierarchical tree 600 according to Algorithm 1, below:

---

Algorithm 1 HIERAGGCLUSTER

---

Figure 6:
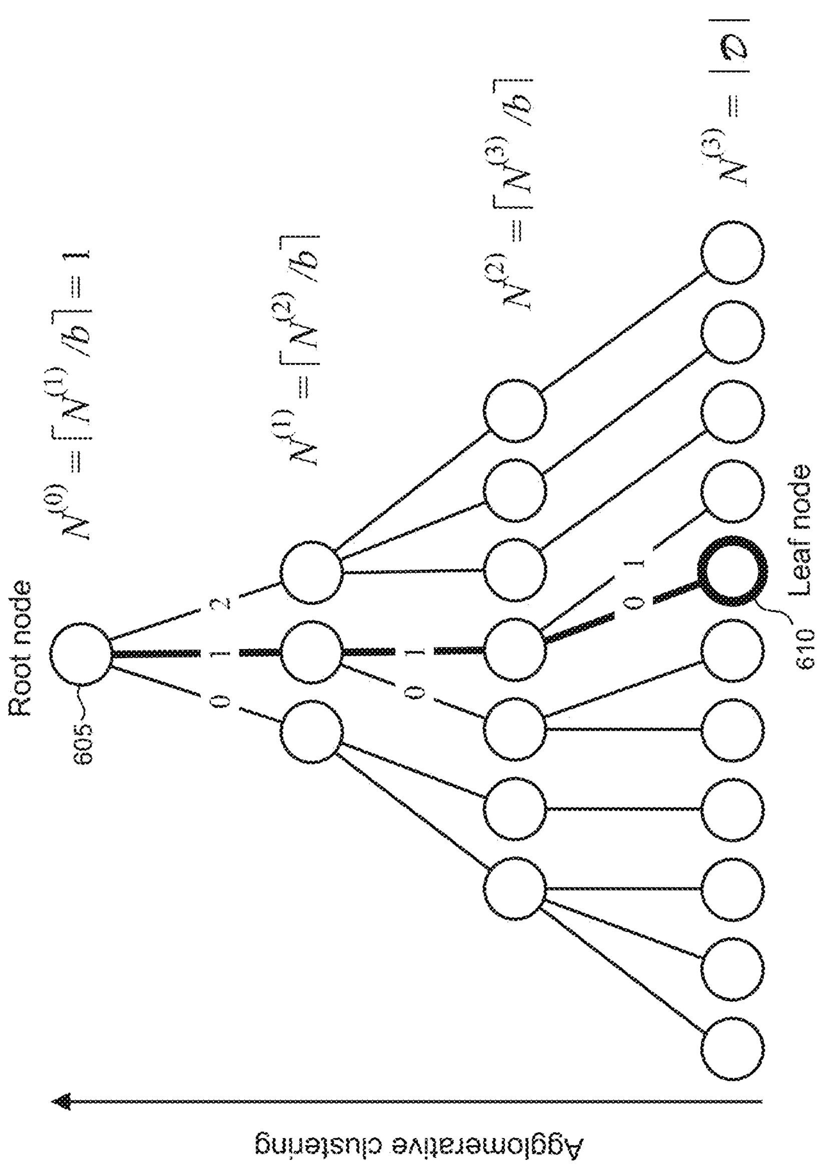
FIG. 6 shows an illustrative hierarchical tree representation of a document corpus with a depth of three that is generated using agglomerative clustering.

Require: vectors $v_i \in \mathbb{R}^n$, $1 \le i \le |\mathcal{D}|$
Require: branching factor b
$t \leftarrow \lceil \log_b |\mathcal{D}| \rceil$
$T(t) \leftarrow \{\mathrm{TREE}(v_i, \emptyset)\}$ ▹ A forest of leaf nodes
$K \leftarrow \lceil |\mathcal{D}|/b \rceil$
while $t > 0$ do -continued Algorithm 1 HIERAGGCLUSTER $T^{(t-1)} \leftarrow$ SPHKMEANS($T^{(t)}$, K)
 ▹ Clusters into a forest of subtrees
 $t \leftarrow t-1$
 $K \leftarrow \lceil K/b \rceil$
end while
return $T^{(0)}$ ▹ Returns a tree with a single root As shown in FIG. 6, the path from the root node 605 is kept the same length for all documents in the hierarchical tree 600 to facilitate easier parallelization on processors (e.g., graphics processing units (GPUs)) that are typically utilized for information retrieval. Starting with $|\mathcal{D}|$ vectors for the entire corpus, spherical K-means clustering is performed (or normal K-means if not normalizing the vectors to the hypersphere), where $K=\lceil|\mathcal{D}|/b\rceil$. Here b is a branching factor. Recursion is performed until K=1, when all clusters are collected into a single root node. Note that for each tree node there is no guarantee that it has exactly b children, and b can be understood as the expected number of vectors in each cluster. For each clustering step, spherical K-means clustering is used according to Algorithm 2, below:

Algorithm 2 SPHKMEANS

Require: vectors $v_i \in \mathbb{R}^n$, $1 \le i \le |\mathcal{D}|$
Require: number of clusters K
 $\forall i, a_i \sim \mathrm{Unif}\{1, \ldots, K\}$ ▹ Random init
 while $a_i$ not converged do $$\forall k, c_k \leftarrow \frac{\sum_{i:a_i=k} v_i}{\left\|\sum_{i:a_i=k} v_i\right\|}$$ ▹ E step $\forall i, a_i \leftarrow \arg\max_k v_i \cdot c_k$ ▹ M step
end while
return $\{\mathrm{Tree}(c_k, \{i: v_i\}_{a_i=k}\}_{1\le k\le K}$
 ▹ Returns a forest of clusters
 ▹ TREE(r; C) is a tree with root r and children C The resulting hierarchical tree $\mathcal{T}$=T(0) has depth $L=\lceil \log_b |\mathcal{D}|\rceil$, so that each document d can be encoded as a fixed-length path $$p_d = \left(p_d^{(1)}, \ldots, p_d^{(L)}\right)$$

from the root. As shown in FIG. 6, the highlighted leaf node 610 has its path to root p=(1, 1, 0) shown using the bold line. Each prefix $(p^{(1)}, \ldots, p^{(l)})$ (l<L) of this path points to a nonterminal node c of this tree 600 and corresponds to a centroid from the hierarchical clustering process. The vector of the centroid is denoted as $c(p^{(1)}, \ldots, p^{(l)}) \in \mathbb{R}^n$.

Once the hierarchical tree 600 is generated using agglomerative clustering, as described above, the hierarchy-aware loss is computed. A common form of the loss is shown in Equation (1) below:

$$\mathcal{L}_C(q, d^+, D^-) = -\log\frac{\exp S(q, d^+)}{\exp S(q, d^+) + \sum_{d^- \in D^-} \exp S(q, d^-)}, \quad (1)$$

Where S(q, d) is the scoring function between vectors. This scoring function is usually just an inner product (optionally scaled by a temperature t) between vector embeddings $S(q, d)=q\cdot d/\tau$, or a normalized version $$S(q, d) = \frac{q \cdot d}{\tau \cdot \|q\| \cdot \|d\|}$$

where cosine similarity is computed.

A hierarchical version of a sequence decoding loss function typically used in generative retrieval is shown in Equation (2) below:

$$\mathcal{L}_{GR\text{-}hier}(q, d^+) = -\sum_{t=1}^{|p_{d^+}|} \log\frac{\exp s^{(t)} \cdot v\left(p_{d^+}^{(t)}\right)}{\sum_{p\in\Sigma^{(t)}} \exp s^{(t)} \cdot v(p)} = \sum_{t=1}^{|p_{d^+}|} \mathcal{L}_C\left(s^{(t)}, v\left(p_{d^+}^{(t)}\right), \{v_p\}_{p\in\Sigma^{(t)}}\right), \quad (2)$$

where t is the decoder step, $s^{(t)}$ is the decoder state at step t, and $\Sigma^{(t)}$ is the set of symbols allowed on depth t of the hierarchy. Positive document candidates $d^+$ having relevance to a query q are distinguished from negative documents (i.e., $d^- \in D^-$).

It may be appreciated that an atomic version and hierarchical versions of a Differentiable Search Index (DSI) were proposed by Yi Tay et al. (2022) for generative retrieval. The atomic version may be considered a form of contrastive learning where the positive documents are contrasted with all other documents in the corpus. Vector embeddings for all documents are saved as parametric memory and updated under gradient descent for each training iteration. This approach differs from contrastive learning in dense retrievers where a small set of negative samples are typically sampled from the corpus.

The atomic version of DSI typically does not scale efficiently, as the number of candidate documents increases, because the size of parametric memory scales linearly with document set size. Thus, the DSI authors proposed the hierarchical version that limits the number of tokens that the decoder generates. In the hierarchical version, a hierarchy of documents is pre-computed before training via divisive K-means clustering.

The set of documents is arranged as leaves in a tree, where intermediate nodes are clustering centroids. In this tree $\mathcal{T}$, each document d is assigned a path $$p_d = \left(p_d^{(1)}, \ldots, p_d^{|p_d|}\right)$$

from a root of the hierarchy. The DSI decoder is expected to output this path $p_d$ as the sequence output. In conventional generative retrieval methods, including DSI, the construction of the tree is typically considered as a separate preprocessing step that is often performed by a different encoder that is separate from the query and document encoder.

From Equation (2), it is observed that a hierarchical version of generative retrieval performs contrastive learning at each step in the decoding process where at each step t, the decoder state $s^{(t)}$, acting as a query, is matched with all possible tokens $\Sigma^{(t)}$. The correct action at this step $$p_{d^+}^{(t)}$$

is contrasted against all other steps. Essentially, then, generative retrieval takes tiered hierarchical negative samples by contrasting the vector of the positive path against the vector of the negative paths on each tier of the hierarchical tree.

The adaptation of sequence decoding loss $\mathcal{L}_{GR\text{-}hier}$ from DSI generative retrieval to the present hierarchical corpus encoder employs two modifications. Since the hierarchical corpus encoder uses an encoder-only architecture, the same query vector is maintained across all steps, that is, the vector embedding q=F(q) of the query q. In addition, vectors for intermediate nodes are the centroid vectors of the prefixes from K-means clustering. As such, given query q and its relevant document d+, at step t on the hierarchical tree $\mathcal{T}$ the positive prefix $$(p_{d^+}^{(0)}, \ldots, p_{d^+}^{(t)})$$

is contrasted against all its siblings $$\{(p_{d^+}^{(0)}, \ldots, p_{d^+}^{(t-1)}, p') \mid p' \neq p_{d^+}^{(t)}\}$$

to thereby describe the hierarchy loss, as shown in Equation (3) below:

$$\mathcal{L}_H^{(t)}(q, d^+) = \mathcal{L}_C(q, c(p_{d^+}^{(0)}, \ldots, p_{d^+}^{(t)}), \{c(p_{d^+}^{(0)}, \ldots, p_{d^+}^{(t-1)}, p') \mid p' \neq p_{d^+}^{(t)}\}) \quad (3)$$

In some applications, the hierarchy loss could use the contrast between positive and negative samples at each tier to thereby take tiered hierarchical negative samples across the hierarchical tree 600:

$$\mathcal{L}_H(q, d^+) = \sum_{t=1}^{L} \mathcal{L}_H^{(t)}(q, d^+). \quad (4)$$

However, in other applications it may not be memory-efficient to store the vector embeddings of all the documents in a corpus as parameters in leaf nodes in the hierarchical tree. This may be addressed in some scenarios, for example, by retaining vectors for the first M (M<L) tiers of the L layers in memory. The hierarchy loss from Equation (3) is applied to the first M layers, while for the last (L−M) layers, regular contrastive loss is utilized in which negative samples are sampled within the children of the prefix:

$$\mathcal{L}_{HCE}(q, d^+) = \underbrace{\sum_{t=1}^{M} \mathcal{L}_H^{(t)}(q, d^+)}_{\text{Hierarchy loss}} + \underbrace{\sum_{t=M+1}^{L} \mathcal{L}_C^{\leftrightarrow}(\mathcal{L}_H^{(t)}(q, d^+, \text{Sample}_{n_{NS}}(p_{d^+}^{(1)}, \ldots, p_{d^+}^{(t)}) \setminus \{d^+\})}_{\text{Contrastive loss with negative samples}}. \quad (5)$$

where $$\mathcal{L}_C^{\leftrightarrow}$$

is a bi-directional contrastive loss and $\text{Sample}_{n_{NS}}(p)$ samples $n_{NS}$ documents that are children of the prefix p. For example, for the results shown in the table in FIG. 8, $n_{NS}$=4.

The bi-directional contrastive loss computation combines several known techniques such that a candidate is viewed as the query and the queries in the batch are viewed as candidates:

$$\mathcal{L}_C^{\leftrightarrow}(B) = -\frac{1}{|B|}\sum_{i \in B}\left[\underbrace{\log\frac{\exp S(q_i, d_i^+)}{\sum_{j \in B}\exp S(q_i, d_j^+) + \sum_{d_i^- \in D_i^-}\exp S(q_i, d_i^-)}}_{\text{query to doc}} + \underbrace{\log\frac{\exp S(q_i, d_i^+)}{\sum_{j \in B}\exp S(q_i, d_j^+)}}_{\text{doc to query (no neg. samlpes)}}\right]. \quad (6)$$

While conventional generative retrieval typically separates processes for the hierarchy construction from the query and document vector embedding coding, the hierarchical corpus encoder and hierarchical tree are co-trained to provide for joint optimization of these components. In an illustrative embodiment, the joint optimization utilizes training using an EM (Expectation-Maximization) algorithm to implement improvements through end-to-end optimization. An EM-style co-training setup uses coordinate descent with alternating maximization, as described in Algorithm (3) below:

Algorithm 3 EM-STYLE-TRAIN

Require: Training dataset $S_{train}$
Require: Validation dataset $S_{dev}$
Require: Document collection $\mathcal{D}$
Require: Initial model checkpoint $F_0$
 $F \leftarrow F_0$
 $\mathcal{T} \leftarrow$ HIERAGGCLUSTER $(\{F_0(d)\}_{d \in \mathcal{D}})$
 $m \leftarrow$ METRIC$(F, S_{dev}, \mathcal{D})$ ▷ Metric on $F_0$
 while early stopping criteria not met do
  $F' \leftarrow$ OPTIMIZE$(F, \mathcal{T}, S_{train}, \mathcal{D})$
  $m' \leftarrow$ METRIC$(F', S_{dev}, \mathcal{D})$
  if m' > m then ▷ A better representation found
   $\mathcal{T} \leftarrow$ HIERAGGCLUSTER $(\{F'(d)\}_{d \in \mathcal{D}})$
   $m \leftarrow m'$
  end if
  $F \leftarrow F'$
 end while
return F As shown in Algorithm 3, after an epoch of training, if the metric on the validation set increases (meaning that a better representation of the corpus has been obtained), a re-clustering of the corpus will be triggered.

FIG. 7 shows an illustrative example of hierarchy-aware training of the hierarchical corpus encoder 110 using the principles discussed above in which a query 705 is contrasted with tiered negative samples from a hierarchical tree 710 representation of a document set in a corpus. In this example, the query and documents are taken from the NQ320k dataset which is a subset of the Natural Questions (NQ) dataset. That dataset is a common benchmark for evaluating the performance of generative and dense retrieval models because it contains real-world search queries and information needs.

As shown, the hierarchy loss is determined from tier 1 (indicated by reference numeral 715) and tier 2 (720) in which the positive prefix p for the query q is compared against all of the sibling nodes. At tier N (725), located in the hierarchy 710 further away from the root node 730, conventional contrastive loss is utilized for training.

FIG. 8 shows a chart 800 comparing the performance of the present hierarchical corpus encoder with various other conventional information retrieval models under non-supervised training scenarios. The performance data metric is NDCG@10 (Normalized Discounted Cumulative Gain at rank 10) using an average for the heterogeneous BEIR benchmark for different information retrieval tasks for its associated BEIR-14 dataset representing diverse corpora of documents. The normalization used by the NDCG@10 metric provides for NDCG values that range from 0 to 1, where 1 indicates a perfect ranking (i.e., all relevant documents are at the top of document list 215 (FIG. 2). As shown in the chart, the performance of the hierarchical corpus encoder is demonstrably better compared to the other models.

FIG. 9 is a flowchart 900 of an illustrative method, operating on an information retrieval system, for performing information retrieval from a corpus of documents. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 905 includes configuring a dense encoder to generate vector embeddings for documents in the corpus. Block 910 includes arranging the vector embeddings into a hierarchical tree comprising nodes arranged in multiple tiers using agglomerative clustering, in which nodes are centroids for clusters of similar data points based on the vector embeddings, the nodes being collected to a single root node of the hierarchical tree. Block 915 includes co-training the dense encoder and hierarchical tree using a hierarchy-aware loss function in which query vectors provide positive samples that are contrasted with vectors of sibling nodes of the hierarchical tree as negative samples.

Figure 10:
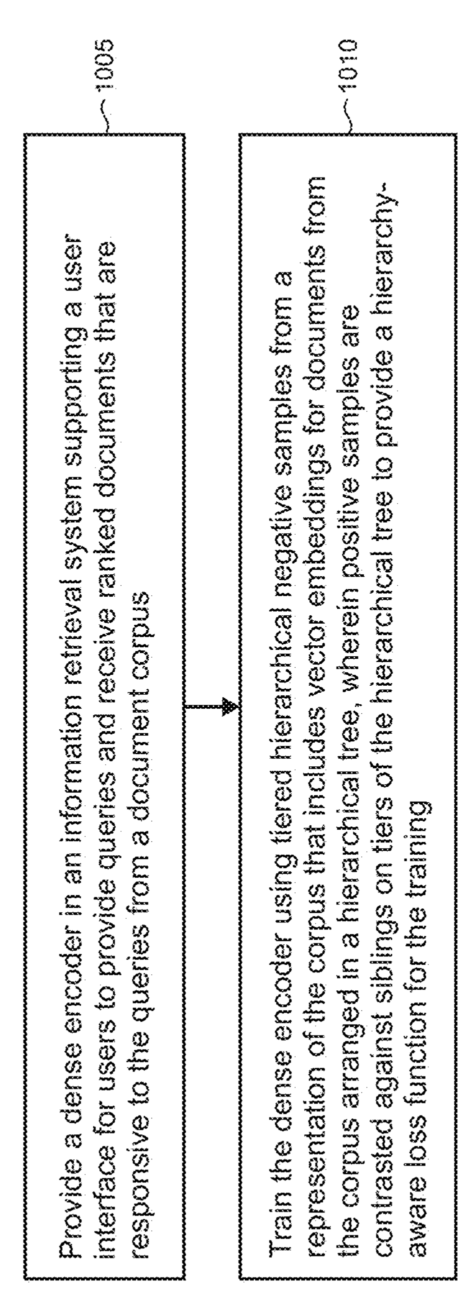

FIG. 10 is a flowchart 1000 of an illustrative method that is implementable using the present principles. Block 1005 includes providing a dense encoder in an information retrieval system supporting a user interface for users to provide queries and receive ranked documents that are responsive to the queries from a document corpus. Block 1010 includes training the dense encoder using tiered hierarchical negative samples from a representation of the corpus that includes vector embeddings for documents from the corpus arranged in a hierarchical tree, wherein positive samples are contrasted against siblings on tiers of the hierarchical tree to provide a hierarchy-aware loss function for the training.

FIG. 11 is a flowchart 1100 of an illustrative method that is performable on a computing device in accordance with the present principles. Block 1105 includes implementing a hierarchical corpus encoder in an information retrieval system. Block 1110 includes operating the hierarchical corpus encoder to compute vector embeddings in a set of documents in a corpus.

Block 1115 includes performing hierarchical clustering of the vector embeddings to form a tiered hierarchical tree having a single root node, wherein each document in the corpus is encoded having a fixed length path from the root node. Block 1120 includes using the hierarchical corpus encoder trained with a loss function in which a path for a query vector to a positive sample in the hierarchical tree is contrasted with paths to negative samples on each of a plurality of tiers of the hierarchical tree.

Block 1125 includes receiving a query from a user of the information retrieval system. Block 1130 includes operating the hierarchical corpus encoder to compute vector embeddings for the query. Block 1135 includes retrieving documents from the corpus responsive to the query using an external document index by matching query vector embeddings to document vector embeddings contained in the external document index.

Figure 12:
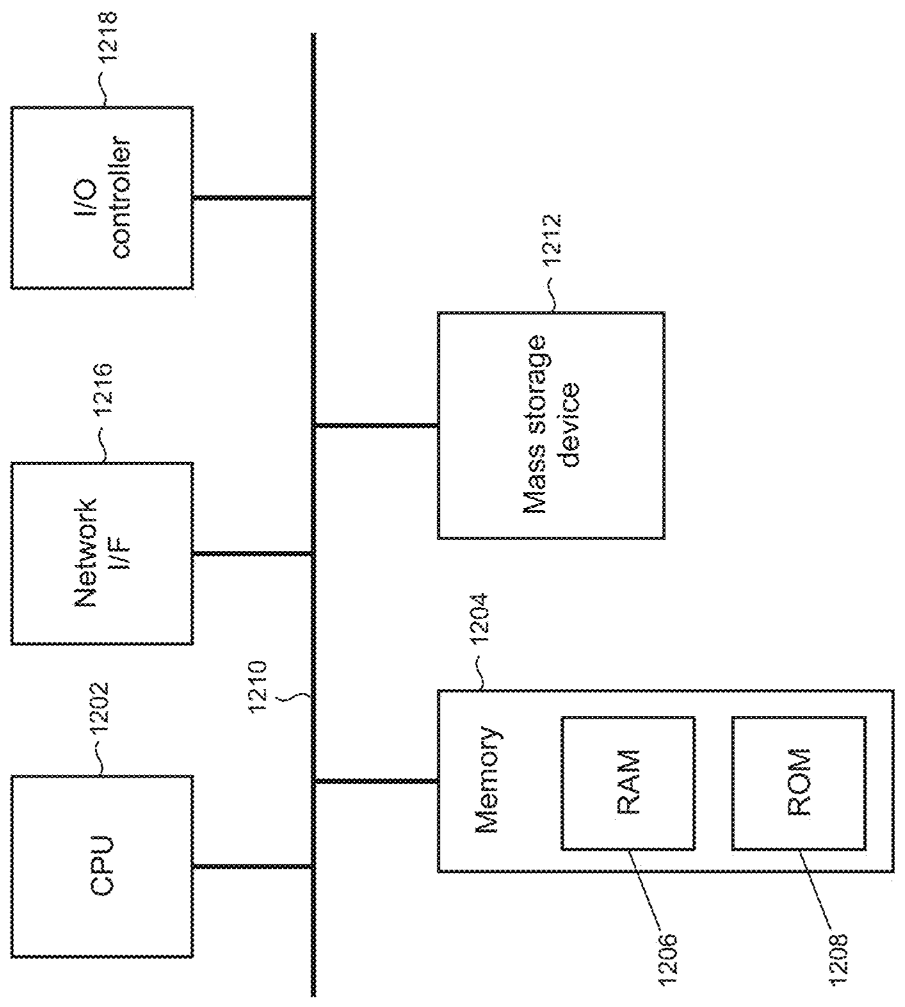
FIG. 12 is a simplified block diagram of an illustrative computer system that may be used at least in part to implement the present information retrieval system using a hierarchical corpus encoder.

FIG. 12 shows an illustrative architecture 1200 for a computing device, such as a server, capable of executing the various components described herein for the present information retrieval system using a hierarchical corpus encoder. The architecture 1200 illustrated in FIG. 12 includes one or more processors 1202 (e.g., central processing unit, dedicated AI chip, graphics processing unit, etc.), a system memory 1204, including RAM (random access memory) 1206 and ROM (read only memory) 1208, and a system bus 1210 that operatively and functionally couples the components in the architecture 1200. A basic input/output system containing the basic routines that help to transfer information between elements within the architecture 1200, such as during startup, is typically stored in the ROM 1208. The architecture 1200 further includes a mass storage device 1212 for storing software code or other computer-executed code that is utilized to implement applications, the file system, and the operating system. The mass storage device 1212 is connected to the processor 1202 through a mass storage controller (not shown) connected to the bus 1210. The mass storage device 1212 and its associated computer-readable storage media provide non-volatile storage for the architecture 1200. Although the description of computer-readable storage media contained herein refers to a mass storage device, such as a hard disk or CD-ROM drive, it may be appreciated by those skilled in the art that computer-readable storage media can be any available storage media that can be accessed by the architecture 1200.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It may be appreciated that the network interface unit 1216 also may be utilized to connect to other types of networks and remote computer systems. The architecture 1200 also may include an input/output controller 1218 for receiving and processing input from a number of other devices, including a keyboard, mouse, touchpad, touchscreen, and/or control devices such as buttons and switches or electronic stylus (not shown in FIG. 12). Similarly, the input/output controller 1218 may provide output to a display screen, user interface, a printer, or other type of output device (also not shown in FIG. 12).

It may be appreciated that the software components described herein may, when loaded into the processor 1202 and executed, transform the processor 1202 and the overall architecture 1200 from a general-purpose computing system into a special-purpose computing system customized to facilitate the functionality presented herein. The processor 1202 may be constructed from any number of transistors or other discrete circuit elements, which may individually or collectively assume any number of states. More specifically, the processor 1202 may operate as a finite-state machine, in response to executable instructions contained within the software modules disclosed herein. These computer-executable instructions may transform the processor 1202 by specifying how the processor 1202 transitions between states, thereby transforming the transistors or other discrete hardware elements constituting the processor 1202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon. For purposes of this specification and the claims, the phrase "computer-readable storage media" and variations thereof, are intended to cover non-transitory embodiments, and does not include waves, signals, and/or other transitory and/or intangible communication media.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1200 in order to store and execute the software components presented herein. It also may be appreciated that the architecture 1200 may include other types of computing devices, including wearable devices, handheld computers, embedded computer systems, smartphones, PDAs, and other types of computing devices known to those skilled in the art. It is also contemplated that the architecture 1200 may not include all of the components shown in FIG. 12, may include other components that are not explicitly shown in FIG. 12, or may utilize an architecture completely different from that shown in FIG. 12.

Various exemplary embodiments of the present information retrieval system using a hierarchical corpus encoder are now presented by way of illustration and not as an exhaustive list of all embodiments. An example includes a method, operating on an information retrieval system, for performing information retrieval from a corpus of documents, comprising: configuring a dense encoder to generate vector embeddings for documents in the corpus; arranging the vector embeddings into a hierarchical tree comprising nodes arranged in multiple tiers using agglomerative clustering, in which nodes are centroids for clusters of similar data points based on the vector embeddings, the nodes being collected to a single root node of the hierarchical tree; and co-training the dense encoder and hierarchical tree using a hierarchy-aware loss function in which query vectors provide positive samples that are contrasted with vectors of sibling nodes of the hierarchical tree as negative samples.

In another example, the method further comprises generating an external document index, the generating comprising encoding documents in the corpus into vectors or encoding passages in documents in the corpus into vectors, the vectors being stored in the external document index. In another example, the method further comprises receiving queries from users of the information retrieval system, encoding the queries into vectors, and performing similarity searches to identify and retrieve documents from the corpus based on similarities between query vectors and vectors in the external document index. In another example, the external document index is configured in accordance with one of MIPS (maximum inner product search) or NNS (nearest neighbor search). In another example, the dense encoder comprises a machine learning model based on T5 (text-to-text transfer transformer). In another example, the method further comprises, during training, using the hierarchy-aware loss function for a predetermined number of tiers in the hierarchical tree and using a contrastive loss function for a different predetermined number of tiers in the hierarchical tree. In another example, the co-training comprises one of supervised training, in which a query-document relevance dataset is present; or zero-shot training, in which a query-document relevance dataset is absent.

A further example includes a computer-readable storage device storing computer-executable instructions, the computer-readable storage device operatively coupled to a processor in a computing device, the processor being responsive to the computer-executable instructions and operative for: providing a dense encoder in an information retrieval system supporting a user interface for users to provide queries and receive ranked documents that are responsive to the queries from a document corpus; and training the dense encoder using tiered hierarchical negative samples from a representation of the corpus that includes vector embeddings for documents from the corpus arranged in a hierarchical tree, wherein positive samples are contrasted against siblings on tiers of the hierarchical tree to provide a hierarchy-aware loss function for the training.

In another example, the hierarchy-aware loss function further comprises a contrastive loss component. In another example, the contrastive loss component comprises negative samples from children of a prefix of a training query. In another example, the computer-executable instructions are further operative for jointly training the dense encoder and hierarchical tree using EM-style (Expectation-Maximization) training using coordinate descent with alternating maximization. In another example, the dense encoder is configured as one of a single encoder or a dual-encoder with shared parameters. In another example, the hierarchical tree is generated using K-means clustering. In another example, the computer-executable instructions are further operative for re-indexing the external document index responsive to distortions in the hierarchical tree representation of the corpus. In another example, the computer-executable instructions are further operative for performing downstream tasks.

A further example includes a computing device, comprising: a memory for storing executable program code; and a processor, functionally coupled to the memory, the processor being responsive to computer-executable instructions contained in the program code and operative for: implementing a hierarchical corpus encoder in an information retrieval system; operating the hierarchical corpus encoder to compute vector embeddings in a set of documents in a corpus; performing hierarchical clustering of the vector embeddings to form a tiered hierarchical tree having a single root node, wherein each document in the corpus is encoded having a fixed length path from the root node; using the hierarchical corpus encoder that is trained with a loss function in which a path for a query vector to a positive sample in the hierarchical tree is contrasted with paths to negative samples on each of a plurality of tiers of the hierarchical tree; receiving a query from a user of the information retrieval system; operating the hierarchical corpus encoder to compute vector embeddings for the query; and retrieving documents from the corpus responsive to the query using an external document index by matching query vector embeddings to document vector embeddings contained in the external document index.

In another example, the computer-executable instructions in the program code are further operative for jointly training the hierarchical corpus encoder and hierarchical tree, in which the vector embeddings are re-clustered to provide a hierarchical tree that provides more optimized representation of the corpus. In another example, the computer-executable instructions in the program code are further operative for contrasting a positive prefix for the query against all its siblings on a tier of the hierarchical tree. In another example, the computer-executable instructions in the program code are further operative for providing downstream tasks comprising one or more of answering questions relating to the corpus or providing links relating to the corpus. In another example, the hierarchal corpus encoder comprises a dense retrieval-based encoder.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, operating on an information retrieval system, for performing information retrieval from a corpus of documents, comprising:

configuring a dense encoder to generate vector embeddings for the documents in the corpus;

arranging the vector embeddings into a hierarchical tree comprising nodes including intermediate nodes and leaves arranged in multiple tiers using agglomerative clustering, in which the intermediate nodes are centroids for clusters of similar data points based on the vector embeddings, the intermediate nodes and the leaves being collected to a single root node of the hierarchical tree, wherein each document in the corpus is encoded into the hierarchical tree as one of the leaves, wherein each of the leaves of the hierarchical tree has an equal length from the single root node; and co-training the dense encoder and the hierarchical tree using a hierarchy-aware loss function in which query vectors provide positive samples that are contrasted with vectors of sibling nodes of the hierarchical tree as negative samples.

2. The method of claim 1, further comprising generating an external document index, the generating comprising encoding the documents in the corpus into first vectors or encoding passages in documents in the corpus into second vectors, the first and second vectors being stored in the external document index.

3. The method of claim 2, further comprising receiving queries from users of the information retrieval system, encoding the queries into query vectors, and performing similarity searches to identify and retrieve documents from the corpus based on similarities between the query vectors and vectors of the first and second vectors in the external document index.

4. The method of claim 3, in which the external document index is configured in accordance with one of MIPS (maximum inner product search) or NNS (nearest neighbor search).

5. The method of claim 1, in which the dense encoder comprises a machine learning model based on T5 (text-to-text transfer transformer).

6. The method of claim 1, further comprising, during training, using the hierarchy-aware loss function for a predetermined number of tiers in the hierarchical tree and using a contrastive loss function for a different predetermined number of tiers in the hierarchical tree.

7. The method of claim 1, in which the co-training comprises one of supervised training, in which a query-document relevance dataset is present, or zero-shot training, in which a query-document relevance dataset is absent.

8. A non-transitory computer-readable storage device storing computer-executable instructions, the computer-readable storage device operatively coupled to a processor in a computing device, the processor being responsive to the computer-executable instructions and operative for:

providing a dense encoder in an information retrieval system supporting a user interface for users to provide queries and receive ranked documents that are responsive to the queries from a document corpus; and training the dense encoder using tiered hierarchical negative samples from a representation of the document corpus that includes vector embeddings for documents from the document corpus arranged in a hierarchical tree including intermediate nodes and leaves arranged in multiple tiers, wherein positive samples are contrasted against siblings on tiers of the hierarchical tree to provide a hierarchy-aware loss function for the training, wherein the intermediate nodes are centroids for clusters of similar data points based on the vector embeddings, the intermediate nodes and the leaves being collected to a single root node of the hierarchical tree, wherein each document in the document corpus is encoded into the hierarchical tree as one of the leaves, wherein each of the leaves of the hierarchical tree has an equal length from the single root node.

9. The non-transitory computer-readable storage device of claim 8, wherein the hierarchy-aware loss function further comprises a contrastive loss component.

10. The non-transitory computer-readable storage device of claim 9, wherein the contrastive loss component comprises negative samples from children of a prefix of a training query.

11. The non-transitory computer-readable storage device of claim 10, in which the computer-executable instructions are further operative for jointly training the dense encoder and the hierarchical tree using EM-style (Expectation-Maximization) training using coordinate descent with alternating maximization.

12. The non-transitory computer-readable storage device of claim 8, wherein the dense encoder is configured as one of a single encoder or a dual-encoder with shared parameters.

13. The non-transitory computer-readable storage device of claim 8, wherein the hierarchical tree is generated using K-means clustering.

14. The non-transitory computer-readable storage device of claim 8, in which the computer-executable instructions are further operative for re-indexing the external document index responsive to distortions in the hierarchical tree representation of the document corpus.

15. The non-transitory computer-readable storage device of claim 8, in which the computer-executable instructions are further operative for performing downstream tasks.

16. A computing device, comprising:
- a memory for storing executable program code; and
- a processor, functionally coupled to the memory, the processor being responsive to computer-executable instructions contained in the program code and operative for:
- implementing a hierarchical corpus encoder in an information retrieval system;
- operating the hierarchical corpus encoder to compute vector embeddings in a set of documents in a corpus;
- performing hierarchical clustering of the vector embeddings to form a tiered hierarchical tree having a single root node, intermediate nodes and leaves arranged in multiple tiers, wherein the intermediate nodes are centroids for clusters of similar data points based on the vector embeddings, the intermediate nodes and the leaves being collected to the single root node, wherein each document in the corpus is encoded into the hierarchical tree as one of the leaves, wherein each of the leaves of the hierarchical tree has an equal length from the single root node;
- using the hierarchical corpus encoder that is trained with a loss function in which a path for a query vector to a positive sample in the hierarchical tree is contrasted with paths to negative samples on each of a plurality of tiers of the hierarchical tree;
- receiving a query from a user of the information retrieval system;
- operating the hierarchical corpus encoder to compute query vector embeddings for the query; and
- retrieving documents from the corpus responsive to the query using an external document index by matching the query vector embeddings to document vector embeddings contained in the external document index.

17. The computing device of claim 16 in which the computer-executable instructions in the program code are further operative for jointly training the hierarchical corpus encoder and the hierarchical tree, in which the vector embeddings are re-clustered to provide a hierarchical tree that provides more optimized representation of the corpus.

18. The computing device of claim 16 in which the computer-executable instructions in the program code are further operative for contrasting a positive prefix for the query against all its siblings on a tier of the hierarchical tree.

19. The computing device of claim 16 in which the computer-executable instructions in the program code are further operative for providing downstream tasks comprising one or more of answering questions relating to the corpus or providing links relating to the corpus.

20. The computing device of claim 16 in which the hierarchal corpus encoder comprises a dense retrieval-based encoder.

* * * * *